Sept. 23, 1924.

C. CRETORS 1,509,714

PAN FOR CORN POPPING MACHINES

Filed Dec. 23, 1921

INVENTOR.
Charles Cretors,
BY
Robert A. Burns
ATTORNEY.

Patented Sept. 23, 1924.

1,509,714

UNITED STATES PATENT OFFICE.

CHARLES CRETORS, OF CHICAGO, ILLINOIS.

PAN FOR CORN-POPPING MACHINES.

Application filed December 23, 1921. Serial No. 524,377.

*To all whom it may concern:*

Be it known that I, CHARLES CRETORS, a citizen of the United States of America, residing at Chicago, in the county of Cook and State of Illinois, have invented certain new and useful Improvements in Pans for Corn-Popping Machines, of which the following is a specification.

This invention relates to the open top type of pans used in corn popping apparatus, and in which a rotary stirrer is employed to continually agitate the material during the popping operation.

The present improvement has for its object, to provide a structural formation and combination of parts wherein the material undergoing the popping operation is directed outward from the center of the pan into the annular popping zone thereof, and during the progressive discharge of the popped material from the open top of the pan, the unpopped grains of the material are intercepted and retained in the chamber of the pan until, in the case of sound and unpopped grains the same are finally popped, and in the case of unsound grains, the same are retained in said pan chamber until the popping operation is completed and refilled for a succeeding operation, and with which an outward spattering of the butter used in conditioning the mass of popped corn is prevented without interference with the upward and outward movement of said mass as above referred to, all as will hereinafter more fully appear.

In the accompanying drawing:—

Like reference numerals indicate like parts in both views.

Figure 1:
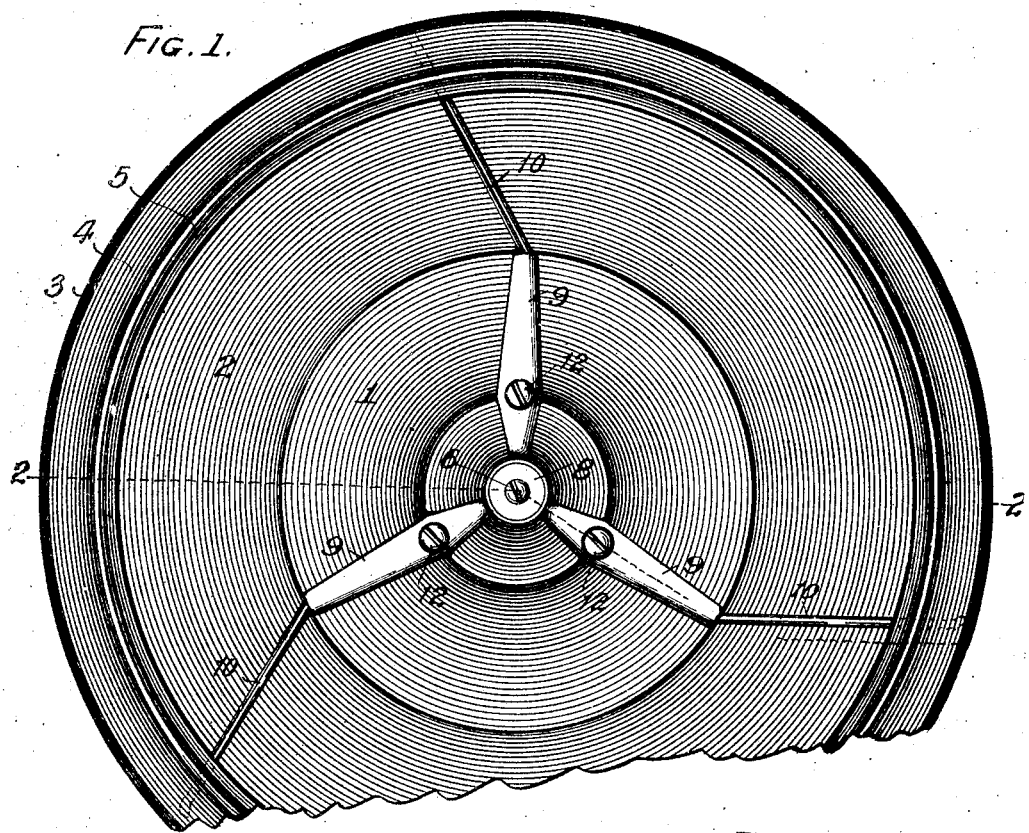
Fig. 1, is a plan view of a popping pan embodying the present improvement, parts being shown broken away.
Figure 2:
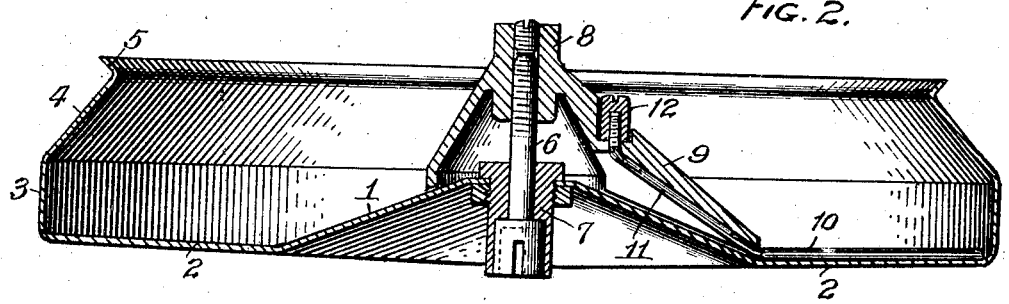
Fig. 2, is a vertical sectional elevation on line 2—2, Fig. 1.

As represented in the drawing the popping pan is of an open top construction, the bottom web of which is formed with a central upstanding conical portion 1 and with an outer flat annular portion 2, beneath which the usual heating unit is arranged. Said heating unit may be either an electric or a gas one, and will have an annular form complementary to the flat portion 2 aforesaid of the pan.

The outer circular upstanding wall 3 of the pan, in the present improvement is formed with an inturned annular flange 4 at its upper end, preferably of the upwardly tapering form shown in Fig. 1. Said flange 4 is in turn provided at its upper edge with an out-turned bead or sub-flange 5 as shown. The described construction providing an annular intercepting chamber for the heavier and unpopped portions of the material operated on as hereinafter more fully set forth.

A centrally arranged driving shaft 6 extends vertically through a bearing bushing 7 secured in the conical portion 1 of the pan, and is adapted for attachment at its lower end to a suitable power source, with its upper end having fixed driving engagement with stirring means as follows:—

A hub is fixed on the upper end of the shaft 6 and is formed with radially and downwardly extending arms 9 adapted for movement in proximity to the upper surface of the conical portion 1 of the pan bottom, and in the preferred construction shown, the arms 9 are of a U-shape in cross section so as to form receiving channels for the attaching ends of a series of stirrer bars.

The stirrer bars 10 above referred to are tangentially arranged and are adapted to move in contact with the annular portion 2 of the pan bottom, and are preferably formed by round rod metal with their attaching portions 11 fitted to the channels of the arms 9 and having angularly disposed and screw threaded ends which pass through orifices in the arms 9 to receive attaching nuts 12 as shown.

With the construction shown, the tendency of the central conical portion 1 of the pan bottom is to shed the material outward onto the annular popping portion 2 of the pan bottom at which point the material receives an effective stirring combined with a gradual outward movement from the tangential stirrer bars 10. In such outward travel the material moves into the annular intercepting chamber formed by the outer pan wall 3 and its inturned annular flange 4, in which the heavy unpopped particles are separated and retained by gravity from the lighter popped portions of the material, with the out-turned bead or flange 5 aiding in the free overflow of the popped material from the pan. The material function and advantage of such construction in a corn popping apparatus, lies in the fact that it very effectively prevents the usual outward spattering of the butter used in conditioning or flavoring the corn, and which is introduced into the mass of corn in its heated and expanded condition and thus avoid the usual and very serious annoyance of the splashing or spattering of the suddenly heated butter particles onto the glass walls of the housing in which the apparatus is enclosed.

Having thus fully described my invention what I claim as new and desire to secure by Letters Patent, is:—

1. The combination of an open top popping pan having its bottom web formed with an upstanding central conical portion, with an outer flat annular portion and with a circular outer wall having an inturned marginal flange at top, the inner edge of said flange having an out-turned annular sub-flange, the construction preventing outward spattering of the heated butter particles in the operation of conditioning the popped mass of corn, and a power driven stirring means arranged in the chamber of the pan.

2. The combination of an open top popping pan having its bottom web formed with an upstanding central conical portion, with an outer flat annular portion and with a flat vertically extending circular outer wall having an inturned marginal flange at top of an upwardly extending conical form, the inner edge of said flange having an out-turned annular sub-flange, the construction preventing outward spattering of the heated butter particles in the operation of conditioning the popped mass of corn, and a power driven stirring means arranged in the chamber of the pan.

3. The combination of an open top popping pan, and a power driven stirring means arranged in the pan chamber adjacent to the bottom of the same, comprising a vertical driving shaft, a hub secured to the upper end of said shaft, outwardly and downwardly extending arms on said hub formed with channels in their under faces, stirrer bars extending from said arms and having attaching portions fitting said channels and having angular end extensions engaging orifices in said arms, and means for securing said extensions in said channels.

4. The combination of an open top popping pan, and a power driven stirring means arranged in the pan chamber adjacent to the bottom of the same, comprising a vertical driving shaft, a hub secured to the upper end of said shaft, outwardly and downwardly extending arms on said hub formed with channels in their under faces, stirrer bars extending from said arms and having attaching portions fitting said channels and having angular end extensions engaging orifices in said arms, and attaching nuts engaging the ends of said angular extensions.

Signed at Chicago, Illinois, this 21st day of December 1921.

CHARLES CRETORS.